United States Patent
Singh et al.

(10) Patent No.: US 9,096,707 B2
(45) Date of Patent: Aug. 4, 2015

(54) ELASTOMERS FOR PAPER MILL EQUIPMENT

(71) Applicants: Harpreet Singh, Pearland, TX (US); William H. Heath, Lake Jackson, TX (US); Amarnath Singh, Pearland, TX (US); Asfar N. Chowdhury, Manchester (GB); Marcin Grigoriew, Macclesfield (GB); Kaoru Aou, Lake Jackson, TX (US)

(72) Inventors: Harpreet Singh, Pearland, TX (US); William H. Heath, Lake Jackson, TX (US); Amarnath Singh, Pearland, TX (US); Asfar N. Chowdhury, Manchester (GB); Marcin Grigoriew, Macclesfield (GB); Kaoru Aou, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/374,056

(22) PCT Filed: Feb. 7, 2013

(86) PCT No.: PCT/US2013/025156
§ 371 (c)(1),
(2) Date: Jul. 23, 2014

(87) PCT Pub. No.: WO2013/122812
PCT Pub. Date: Aug. 22, 2013

(65) Prior Publication Data
US 2014/0352904 A1    Dec. 4, 2014

Related U.S. Application Data

(60) Provisional application No. 61/597,895, filed on Feb. 13, 2012.

(51) Int. Cl.
| | |
|---|---|
| *C08G 18/48* | (2006.01) |
| *C08G 18/44* | (2006.01) |
| *C08G 18/76* | (2006.01) |
| *C08G 18/10* | (2006.01) |
| *C08G 18/12* | (2006.01) |
| *C08G 18/32* | (2006.01) |
| *C08G 18/40* | (2006.01) |
| *D21F 1/00* | (2006.01) |

(52) U.S. Cl.
CPC ............ *C08G 18/44* (2013.01); *C08G 18/10* (2013.01); *C08G 18/12* (2013.01); *C08G 18/324* (2013.01); *C08G 18/4018* (2013.01); *C08G 18/4854* (2013.01); *C08G 18/7621* (2013.01); *C08G 18/7671* (2013.01); *D21F 1/0027* (2013.01)

(58) Field of Classification Search
USPC .................. 162/358.4, 164.6, 358.3, 901, 306
See application file for complete search history.

(56) References Cited

U.S. PATENT DOCUMENTS

| | | | |
|---|---|---|---|
| 4,069,204 A | 1/1978 | Susman | |
| 5,001,208 A | 3/1991 | Ross et al. | |
| 6,964,626 B1 | 11/2005 | Wu et al. | |
| 7,947,154 B2 | 5/2011 | Yazaki et al. | |
| 7,955,475 B2 | 6/2011 | Yazaki et al. | |
| 8,242,229 B2 | 8/2012 | Krause et al. | |
| 8,273,846 B2 | 9/2012 | Nefzger et al. | |
| 2002/0060052 A1* | 5/2002 | Best ........................ | 162/358.4 |
| 2003/0203771 A1 | 10/2003 | Rosenberg et al. | |
| 2006/0191658 A1 | 8/2006 | Watanabe et al. | |
| 2007/0155933 A1 | 7/2007 | Watanabe et al. | |
| 2010/0130701 A1 | 5/2010 | Lahdensuo | |

FOREIGN PATENT DOCUMENTS

| | | |
|---|---|---|
| CA | 2640685 A1 | 8/2007 |
| DE | 102004025942 A1 | 12/2005 |
| JP | 1998311376 | 11/1998 |
| JP | 2002147511 A | 5/2002 |
| JP | 2002147535 A | 5/2002 |
| WO | 9856841 A1 | 12/1998 |

OTHER PUBLICATIONS

International_Search_Report_and_Written_Opinion_for_PCT/ US2013/025156_Mail_Date_Jul. 4, 2013.
International_Preliminary_Report_on_Patentability_for_PCT/ US2013/025156_Mail Date Aug. 28, 2014.

* cited by examiner

*Primary Examiner* — Mark Halpern (57) ABSTRACT

Embodiments of the invention provide for paper mill equipment that can better withstand the conditions of a paper mill. Embodiments encompass paper mill equipment that incorporate a polyurethane layer having a hysteresis value of less than 70% and a permanent set of less than 30%. The polyurethane layer includes a polyurethane produced by curing a mixed composition. The mixed composition includes at least a urethane prepolymer (A) and at least a curing agent (B) having an active hydrogen group (H). The urethane prepolymer (A) has at least one terminal isocyanate group and is obtained by reacting at least a polyisocyanate compound (a) with at least a polycarbonate diol compound (b) having a number average molecular weight of at least 1500 g/mol. The curing agent (B) includes at least an amine compound. The elastomer compositions are also useful to coat the acid pickling roller in the steel industry.

18 Claims, 3 Drawing Sheets

ELASTOMERS FOR PAPER MILL EQUIPMENT

This application is a 371 of PCT/US2013/025156 filed on 27 Feb. 2013 which claims benefit of 61/597,895 filed 13 Feb. 2012.

FIELD OF THE INVENTION

Embodiments of the invention relate to polyurethane elastomers for paper mill equipment, more specifically, elastomers made using polycarbonate polyols

BACKGROUND OF THE INVENTION

Polyurethane elastomers are known to have been employed in the construction of industrial rollers, such as paper machine press rolls and paper machine belts. The polyurethane elastomers are often the product of a reaction between a polyurethane prepolymer and a curing agent. The polyurethane prepolymer is typically made by combining a polyol, typically a Poly (tetra methylene) ether glycol (PTMEG) with an isocyanate. The curing agent is often either a diamine or a short chain diol. Polyurethane elastomers have been selected for use in paper machine press rolls and belts because they exhibit advantages in load bearing capability and abrasion resistance over natural and synthetic rubber materials; this is particularly important for paper mill rolls and belts, where they experience high dynamic loads. However, in some papermaking machines, the rolls and belts are also exposed to high moisture and elevated temperatures. PTMEG may be prone to thermo oxidative decomposition and may have low chemical resistance and low resistance to hydrolysis at high temperatures. Thus, these conditions can cause melting or debonding of the PTMEG based polyurethane, which reduces the part life and also limits working temperature.

Therefore, there is a need for paper mill equipment, such as paper machine press rolls and paper machine belts which can better withstand the conditions of a paper mill.

SUMMARY OF THE INVENTION

Embodiments of the invention provide for paper mill equipment that can better withstand the conditions of a paper mill Embodiments encompass paper mill equipment that incorporates a polyurethane layer having a hysteresis value of less than 70% and a permanent set of less than 30%. The polyurethane layer includes a polyurethane produced by curing a mixed composition. The mixed composition includes at least a urethane prepolymer (A) and at least a curing agent (B) having an active hydrogen group (H). The urethane prepolymer (A) has at least one terminal isocyanate group and is obtained by reacting at least a polyisocyanate compound (a) with at least a polycarbonate diol compound (b) having a number average molecular weight of at least 1500 g/mol. The curing agent (B) includes at least an amine compound.

Embodiments encompass elastomeric covers for papermaking rollers. The elastomeric covers include a polyurethane layer having a hysteresis value of less than 70% and a permanent set of less than 30%. The polyurethane layer includes a polyurethane produced by curing a mixed composition. The mixed composition includes at least a urethane prepolymer (A) and at least a curing agent (B) having an active hydrogen group (H). The urethane prepolymer (A) has at least one terminal isocyanate group and is obtained by reacting at least a polyisocyanate compound (a) with at least a polycarbonate diol compound (b) having a number average molecular weight of at least 1500 g/mol. The curing agent (B) includes at least an amine compound.

Embodiments encompass shoe press belts for papermaking. The shoe press belts include a fabric base and a polyurethane layer which are integral with each other. The polyurethane layer has a hysteresis value of less than 70% and a permanent set of less than 30%. The polyurethane layer includes a polyurethane produced by curing a mixed composition. The mixed composition includes at least a urethane prepolymer (A) and at least a curing agent (B) having an active hydrogen group (H). The urethane prepolymer (A) has at least one terminal isocyanate group and is obtained by reacting at least a polyisocyanate compound (a) with at least a polycarbonate diol compound (b) having a number average molecular weight of at least 1500 g/mol. The curing agent (B) includes at least an amine compound.

Embodiments encompass elastomeric covers for acid pickling rollers. The elastomeric covers include a polyurethane layer having a hysteresis value of less than 70% and a permanent set of less than 30%. The polyurethane layer includes a polyurethane produced by curing a mixed composition. The mixed composition includes at least a urethane prepolymer (A) and at least a curing agent (B) having an active hydrogen group (H). The urethane prepolymer (A) has at least one terminal isocyanate group and is obtained by reacting at least a polyisocyanate compound (a) with at least a polycarbonate diol compound (b) having a number average molecular weight of at least 1500 g/mol. The curing agent (B) includes at least an amine compound.

Embodiments of the invention encompass the paper mill equipment, the elastomeric covers for papermaking rollers or for acid pickling rollers, and the shoe press belts for papermaking described in the embodiments above and having any of the following attributes:

The curing agent (B) further includes at least a polycarbonate diol compound (b) having a number average molecular weight of at least 1500 g/mol, The curing agent (B) further includes at least a polytetramethylene ether glycol (PTMEG) (c), having a number average molecular weight of between 500 and 3000, The urethane prepolymer (A) is obtained by reacting the at least a polyisocyanate compound (a) with the at least a polycarbonate diol compound (b) and at least a polytetramethylene ether glycol (PTMEG) (c), having a number average molecular weight of between 500 and 3000 g/mol, The polycarbonate diol compound (b) has a number average molecular weight of between 1500-3000 g/mol, The at least a polycarbonate diol compound (b) has a number average molecular weight of between 1900 and 2100 g/mol, The at least a polycarbonate diol compound (b) is at least one of a 1,6-hexanediol and/or 1,5-pentanediol based polycarbonate diol, The at least an amine compound is at least one of 3,5-diethyltoluene-2,4-diamine, 3,5-diethyltoluene-2,6-diamine, 3,5-dimethylthiotoluene-2,4-diamine, 3,5-dimethylthiotoluene-2,6-diamine, 4,4'-bis(2-chloroaniline), 4,4'-bis(sec-butyl amino)-diphenylmethane, N,N'-dialkyldiaminodiphenylmethane, 4,4'-methylenedianiline, 4,4'-methylene-bis(2,3-dichloroaniline), 4,4'-methylene-bis(2-chloroaniline), 4,4'-methylene-bis(2-ethyl-6-methylaniline), trimethylene-bis(4-aminobenzoate), poly(tetramethylene oxide)-di-p-aminobenzoate, phenylenediamine, polyetherdiamine, isophorone diamine, 4,4'-methylene-bis-(2-methylcyclohexane-1-amine), 4,4'-methylene-bis(cyclohexaneamine), bis(aminomethyl)cyclohexane, or xylenediamine, The at least an amine compound is at least one of iminobispropylamine, bis(hexamethylene)triamine, triethylenetetramine, tetraethylenepentamine, pentaethylenehexamine, dipropylenetriamine, aminoethylethanolamine, tri(methylamino)hexane, and melamine, The at least an amine compound includes at least 3,5-dimethylthio-2,6-toluenediamine and 3,5-dimethylthio-2,4-toluenediamine, The hysteresis value is less than 60 or 55, The permanent set is less than 25% or 21, and/or The hysteresis value is determined by is stretching a dog bone to 100% strain at a rate of 5"/min and then returned back to its original dimension (one stress strain cycle). The area between the curve (stretch and return cycle) is indicative of the energy dissipated and is expressed as the % of the area under the curve obtained when the sample is stretched. The point of zero stress on the return cycle is the permanent set (PS) and it is indicative of the dimensional change the part would undergo when exposed to dynamic loadings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only exemplary embodiments of this invention and are therefore not to be considered limiting of its scope, for the invention may admit to other equally effective embodiments.

DESCRIPTION OF EMBODIMENTS OF THE INVENTION

Embodiments of the invention provide for paper mill equipment, such as paper machine press rolls and paper machine belts, which can better withstand the conditions of a paper mill Embodiments of the invention encompass paper machine press rolls and paper machine belts that include polycarbonate polyol based polyurethane elastomers. Embodiments of the invention provide for acid pickling rollers which can display resistance to pickling acids.

Embodiments of the polycarbonate polyol based polyurethane elastomers encompass elastomers made by curing a mixed composition including at least a urethane prepolymer (A) and a curing agent (B).

Embodiments of urethane prepolymer (A) include the reaction product of a reaction mixture which includes at least one or more organic polyisocyanate components (a) and one or more polycarbonate polyols (b).

The at least one organic polyisocyanate component (a) may have a functionality from about 1.9 to 4, such as from 1.9 to 3.5, or such as from 2.0 to 3.3. The one or more organic polyisocyanate components may be selected from the group comprising a polymeric polyisocyanate, aromatic polyisocyanates, cycloaliphatic polyisocyanates, or aliphatic polyisocyanates Exemplary polyisocyanates include, for example, m-phenylene diisocyanate, 2,4- and/or 2,6-toluene diisocyanate (TDI), the various isomers of diphenylmethanediisocyanate (MDI), and polyisocyanates having more than 2 isocyanate groups, preferably MDI and derivatives of MDI such as biuret-modified "liquid" MDI products and polymeric MDI (PMDI), 1,3 and 1,4-(bis isocyanatomethyl)cyclohexane, isophorone diisocyanate (IPDI), hexamethylene diisocyanate (HDI), bis(4-isocyanatocyclohexyl)methane or 4,4' dimethylene dicyclohexyl diisocyanate (H12MDI), and combinations thereof, as well as mixtures of the 2,4- and 2,6-isomers of TDI, with the former most preferred in the practice of the invention. A 65/35 weight percent mixture of the 2,4 isomer to the 2,6 TDI isomer is typically used, but the 80/20 weight percent mixture of the 2,4 isomer to the 2,6 TDI isomer is also useful in the practice of this invention and is preferred based on availability. Suitable TDI products are available under the trade name VORANATE which is available from The Dow Chemical Company. Preferred isocyanates include methylene diphenyl diisocyanate (MDI) and or its polymeric form (PMDI) for producing the prepolymers described herein. Such polymeric MDI products are available from The Dow Chemical Company under the trade names ISONATE, PAPI and VORANATE. Suitable commercially available products of that type include ISONATE M 143 MDI which is available from The Dow Chemical Company. Cycloaliphatic polyisocyanate products are available from Evonik Industries under the trade name VESTANAT. Suitable commercially available products of this type include VESTANAT T 1890 polyisocyanate. Aromatic polyisocyanate products are available from Bayer MaterialScience under the trade name DESMODUR polyisocyanate. Suitable commercially available products of this type include DESMODUR L 75 polyisocyanate.

According to embodiments of the invention, the urethane prepolymer (A) reaction mixture further includes at least one or more polycarbonate polyols (b). Embodiments of the polycarbonate polyol include polycarbonate polyol having a number average molecular weight of between about 1500 and 3000 g/mol. All individual values and subranges from 1500 to 3000 g/mol are included herein and disclosed herein; for example, the a number average molecular weight can be from a lower limit of 1500, 1600, 1700, 1800, 1900, 2000, 2100, 2200, 2300, 2400, 2500, or 2600 g/mol, to an upper limit of 1800, 1900, 2000, 2100, 2200, 2300, 2400, 2500, 2600, 2700, 2800, 2900, or 3000 g/mol. In certain embodiments the number average molecular weight is about 2000 g/mol.

The one or more polycarbonate polyols may comprise repeating units from one or more alkane diols having 2 to 50 carbon atoms. The one or more polycarbonate polyols may comprise repeating units from one or more alkane diols having 2 to 20 carbon atoms. The one or more polycarbonate polyols may be difunctional polycarbonate polyols.

The one or more polycarbonate polyols may have a hydroxyl number average from about 22 to about 220 mg KOH/g, for example, from about 45 to 75 mg KOH/g.

The one or more polycarbonate polyols may have a viscosity from about 300 to about 15,000 mPa s measured at 75° C. by parallel plate rheometry.

The one or more polycarbonate polyols may be prepared by reacting at least one polyol mixture comprising one or more alkane diols with at least one organic carbonate. The one or more polycarbonate polyols may be obtained by subjecting the at least one polyol mixture and the at least one carbonate compound to a polymerization reaction. With respect to the method for performing the polymerization reaction, there is no particular limitation, and the polymerization reaction can be performed by using conventional methods known in the art.

The one or more alkane diols may be selected from the group comprising: aliphatic diols having 2 to 50 carbon atoms in the chain (branched or unbranched) which may also be interrupted by additional heteroatoms such as oxygen (O), sulphur (S) or nitrogen (N). Examples of suitable diols are 1,3-propanediol, 1,4-butanediol, 1,5-pentanediol, 1,6-hexandiol, 1,7-heptanediol, 1,2-dodecanediol, cyclohexanedimethanol, 3-methyl-1,5-pentanediol, 2,4-diethyl-1,5-pentanediol, bis(2-hydroxyethyl)ether, bis(6-hydroxyhexyl) ether or short-chain $C_2$, $C_3$ or $C_4$ polyether diols having a number average molecular weight of less than 700 g/mol, combinations thereof, and isomers thereof.

The at least one carbonate compound may be selected from alkylene carbonates, diaryl carbonates, dialkyl carbonates, dioxolanones, hexanediol bis-chlorocarbonates, phosgene and urea. Examples of suitable alkylene carbonates may include ethylene carbonate, trimethylene carbonate, 1,2-propylene carbonate, 5-methyl-1,3-dioxane-2-one, 1,2-butylene carbonate, 1,3-butylene carbonate, 1,2-pentylene carbonate, and the like. Examples of suitable dialkyl carbonates may include dimethyl carbonate, diethyl carbonate, di-n-butyl carbonate, and the like and the diaryl carbonates may include diphenyl carbonate.

The polymerization reaction for the polycarbonate polyol may be aided by a catalyst. With respect to the method for performing the polymerization reaction, there is no particular limitation, and the polymerization reaction can be performed by using conventional methods known in the art. The polymerization reaction may be a transesterification reaction. In a transesterification reaction, one preferably contacts reactants in the presence of a transesterification catalyst and under reaction conditions. In principle, all soluble catalysts which are known for transesterification reactions may be used as catalysts (homogeneous catalysis), and heterogeneous transesterification catalysts can also be used. The process according to the invention is preferably conducted in the presence of a catalyst.

Hydroxides, oxides, metal alcoholates, carbonates and organometallic compounds of metals of main groups I, II, III and IV of the periodic table of the elements, of subgroups III and IV, and elements from the rare earth group, particularly compounds of Ti, Zr, Pb, Sn and Sb, are particularly suitable for the processes described herein.

Suitable examples include: LiOH, $Li_2CO_3$, $K_2CO_3$, KOH, NaOH, KOMe, NaOMe, MeOMgOAc, CaO, BaO, KOt-Bu, $TiCl_4$, titanium tetraalcoholates or terephthalates, zirconium tetraalcoholates, tin octoate, dibutyltin dilaurate, dibutyltin, bistributyltin oxide, tin oxalate, lead stearate, antimony trioxide, and zirconium tetraisopropylate.

Aromatic nitrogen heterocycles can also be used in the process described herein, as can tertiary amines corresponding to $R_1R_2R_3N$, where $R_{1-3}$ independently represents a $C_1$-$C_{30}$ hydroxyalkyl, a $C_4$-$C_{30}$ aryl or a $C_1$-$C_{30}$ alkyl, particularly trimethylamine, triethylamine, tributylamine, N,N-dimethylcyclohexylamine, N,N-dimethyl-ethanolamine, 1,8-diaza-bicyclo-(5.4.0)undec-7-ene, 1,4-diazabicyclo-(2.2.2)octane, 1,2-bis(N,N-dimethyl-amino)-ethane, 1,3-bis(N-dimethyl-amino)propane and pyridine.

Alcoholates and hydroxides of sodium and potassium (NaOH, KOH, KOMe, NaOMe), alcoholates of titanium, tin or zirconium (e.g. $Ti(OPr)_4$), as well as organotin compounds may also be used, wherein titanium, tin and zirconium tetraalcoholates may be used with diols which contain ester functions or with mixtures of diols with lactones.

The amount of catalyst present depends on the type of catalyst. In certain embodiments described herein, the homogeneous catalyst is used in concentrations (expressed as percent by weight of metal with respect to the aliphatic diol used) of up to 1,000 ppm (0.1%), preferably between 1 ppm and 500 ppm (0.05%), most preferably between 5 ppm and 100 ppm (0.01%). After the reaction is complete, the catalyst may be left in the product, or can be separated, neutralized or masked. The catalyst may be left in the product.

Temperatures for the transesterification reaction may be between 120 degrees Celsius and 240 degrees Celsius. The transesterification reaction is typically performed at atmospheric pressure but lower or higher pressures may be used. Vacuum may be applied at the end of the activation cycle to remove any volatiles. Reaction time depends on variables such as temperature, pressure, type of catalyst and catalyst concentration.

Exemplary polycarbonate polyols comprising repeating units from one or more alkane diol components are available from UBE Industries, under the trade name ETERNACOLL and from Bayer MaterialScience, LLC, under the trade name DESMOPHEN polyols.

According to embodiments of the invention, the urethane prepolymer (A) reaction mixture may optionally include other polyols in addition to the one or more polycarbonate polyol. Other suitable polyols include polyether polyols and polyester polyols. The other polyols may be present in a range between 0 mole % and 40 mole % based on the total moles of polyols used to make the urethane prepolymer (A). All individual values and subranges from 0 to 40 mole % are included herein and disclosed herein; for example, the polyols may be present from a lower limit of 0, 1, 5, 10, 15, 20, or 25 mole %, to an upper limit of 5, 10, 15, 20, 25, 30, 35, or 40 mole %.

In certain embodiments, the other polyol is a polytetramethylene ether glycol (PTMEG) (c), having a number average molecular weight of between 500 and 3000 g/mol. The PTMEG may have a structure of $HO(CH_2CH_2CH_2CH_2-O-)_nH$, where n averages between about 7 and about 41. In certain embodiments, n is about 14. In other embodiments, n is about 27.

The at least one organic polyisocyanate component (a) and polyol components (b) and optionally (c) may be reacted at an isocyanate index generally between 120 and 2000. All individual values and subranges from 120 to 2000 are included herein and disclosed herein; for example, the index may be from a lower limit of 120, 200, 700, 1000, and 1500. In certain embodiments the index is between 800-2000.

Curing agent (B) includes at least 20 mole % of at least one organic polyamine compound having an active hydrogen group (H) and a molecular weight in a range from 108 to 1,300 g/mol. Embodiments encompass bifunctional organic diamine compounds such as 3,5-diethyltoluene-2,4-diamine, 3,5-diethyltoluene-2,6-diamine, 3,5-dimethylthiotoluene-2,4-diamine, 3,5-dimethylthiotoluene-2,6-diamine, 4,4'-bis(2-chloroaniline), 4,4'-bis(sec-butylamino)-diphenylmethane, N,N'-dialkyldiaminodiphenylmethane, 4,4'-methylenedianiline, 4,4'-methylene-bis(2,3-dichloroaniline), 4,4'-methylene-bis(2-chloroaniline), 4,4'-methylene-bis(2-ethyl-6-methylaniline), trimethylene-bis(4-aminobenzoate), poly (tetramethylene oxide)-di-p-aminobenzoate, phenylenediamine, polyetherdiamine, isophorone diamine, 4,4'-methylene-bis-(2-methylcyclohexane-1-amine), 4,4'-methylene-bis(cyclohexaneamine), bis(aminomethyl)cyclohexane and xylenediamine. Embodiments of the at least one organic polyamine compound also encompass at least trifunctional organic polyamine compounds such as iminobispropylamine, bis(hexamethylene)triamine, triethylenetetramine, tetraethylenepentamine, pentaethylenehexamine, dipropylenetriamine, aminoethylethanolamine, tri(methylamino)hexane and melamine. Between 20 and 100 mole % of the curing agent (B) is the least one organic polyamine compound. All individual values and subranges from 20 to 100 are included herein and disclosed herein; for example, the curing agent (B) may constitute from a lower limit of 20, 30, 40, 50, 60, 70, 80, 90, or 95, to an upper limit of 30, 40, 50, 60, 70, 80, 90, 95, or 100 mole % of the least one organic polyamine compound.

Curing agent (B) may also optionally include one or more polycarbonate polyols (b) as described above. Curing agent (B) may constitute between 0 and 80 mole % of the one or more polycarbonate polyols. All individual values and subranges from 0 to 80 are included herein and disclosed herein; for example, the one or more polycarbonate polyols may constitute from a lower limit of 0, 1, 5, 10, 15, 20, 25, 30, 40, 50, or 60, to an upper limit of 5, 10, 15, 20, 25, 30, 40, 50, 60, or 70 mole % of the curing agent (B). In certain embodiments curing agent (B) may constitute between 30 and 80 mole % of the one or more polycarbonate polyols.

Curing agent (B) may also optionally include one or more polytetramethylene ether glycol (PTMEG) (c). Curing agent (B) may constitute between 0 and 40 mole % of the one or more PTMEG polyols (c). All individual values and subranges from 0 to 40 are included herein and disclosed herein; for example, the one or more polycarbonate polyols may constitute from a lower limit of 0, 1, 5, 10, 15, 20, 25, or 30, to an upper limit of 5, 10, 15, 20, 25, 30, or 40 mole % of the curing agent (B).

The urethane prepolymer (A) and a curing agent (B) may be reacted at a prepolymer isocyanate index of between 0.85 and 120. All individual values and subranges from 85 to 120 are included herein and disclosed herein; for example, the prepolymer isocyanate index be from a lower limit of 85, 90, 95, 100, 101, 102, 103, 104, 105, 106, or 110, to an upper limit of 90, 95, 100, 101, 102, 103, 104, 105, 106, 110, or 120. In certain embodiments the index is between about 103 and about 105.

For preparing the desired polyurethane elastomer, any urethane curing technique known in the art may be utilized. The urethane prepolymer (A) may be heated to a temperature between about 60 and 200° C., and curing agent (B) may optionally be may be heated to a temperature between about 25 and 200° C. The two components may optionally be reacted in the presence of other components such as catalysts, chain extenders, crosslinkers, fillers, pigments, etc. The urethane prepolymer (A) and curing agent (B) may be dosed and mixed utilizing commercially available dosing metering units and mixing heads.

Paper machine rolls may be coated as is commonly known in the art. For example, the method of application of the polyurethane elastomer coating may be mold casting, rotation casting, submerging, spraying, extrusion, centrifugal casting, lamination, or lining.

Paper machine belts may be made as is commonly known in the art. For example a paper machine belt may include a fabric base, such as a woven scrim, which is spray coated with the polyurethane coating from the mixing head onto one surface of the fabric. The polyurethane impregnates the fabric base to a certain depth, such that the fabric base and the polyurethane layer are integral with each other. The fabric base may also be coated on both surfaces of the fabric base.

Acid pickling rollers may be coated as is commonly known in the art. For example, the method of application of the polyurethane elastomer coating may be mold casting, rotation casting, submerging, spraying, extrusion, centrifugal casting, lamination, or lining. Such coated rollers are generally used in pickling baths to carry strip steel or other metal through a pickling acid, such as hydrochloric or sulfuric acid, or other corrosive liquid. As the polyurea elastomers are based on a thermoset system, the materials can be easily processed by gentle heating in contrast to materials commonly used in this applications.

Embodiments of the polyurethane elastomers have a Shore A hardness of at least 70, 85, or 95 and a Shore D hardness of at least about 40, 50, or 60, according to ASTM D 2240, Test Method for Rubber Property—Durometer Hardness.

Embodiments of the polyurethane elastomers have a hysteresis value of less than 70%, 60%, or less than 55%.

EXAMPLES

The following examples are provided to illustrate the embodiments of the invention, but are not intended to limit the scope thereof. All parts and percentages are by weight unless otherwise indicated.

The following materials are used:

| | |
|---|---|
| TERATHANE 1000 | A polytetramethylene ether glycol (PTMEG) having a structure of $HO(CH_2CH_2CH_2CH_2-O-)_nH$, where n averages 14, and having a number average molecular weight of approximately 1,000 g/mol. Available from Invista. |
| TERATHANE 2000 | A polytetramethylene ether glycol (PTMEG) having a structure of $HO(CH_2CH_2CH_2CH_2-O-)_nH$, where n averages 27, and having a number average molecular weight of approximately 2,000 g/mol. Available from Invista. |
| ETERNACOLL UH-100 | A 1,6-hexanediol based polycarbonate diol with a number average molecular weight of approximately 1,000 g/mol. Available from UBE Industries. |
| ETERNACOLL UH-200 | A 1,6-hexanediol based polycarbonate diol with a number average molecular weight of approximately 2,000 g/mol. Available from UBE Industries. |
| ETERNACOLL PH-200 | A 1,6-hexanediol and 1,5-pentanediol based polycarbonate diol with a number average molecular weight of approximately 2,000 g/mol. Available from UBE Industries. |
| ETHACURE 300 | A curing agent consisting of a mixture of mostly 3,5-dimethylthio-2,6-toluenediamine; and 3,5-dimethylthio-2,4-toluenediamine. Available from Albemarle Corporation. |
| ISONATE* M 125 | An approximately 98/2 weight percent of 4,4'-/2,4'-MDI available from The Dow Chemical Company. |
| VORANATE* T-80 | A toluene diisocyanate (80% 2,4-toluene diisocyanate and 20% 2,6-toluene diisocyanate by weight) composition available from The Dow Chemical Company. |

*ISONATE and VORANATE are trademarks of The Dow Chemical Company.

NCO content is measured according to ASTM D5155.

Dynamic Mechanical Analysis: Samples (47.5 mm×7 mm) are stamped out from the elastomer plaques on an Indusco Hydraulic Swing Arm Cutting Machine. The sample is cut down to 35 mm length with a pair of scissors. The sample is tested on TA instruments ARES rheometer in the torsion fixtures. The linear viscoelastic response (4% strain with auto adjustment) of the sample is measured with oscillatory test (1 Hz) along a temperature ramp (3° C./min).

Tensile Measurements (ASTM D624): The tensile properties of the elastomers are obtained on microtensile bar samples that are punched out from the plaques. The bar is dog bone shaped with a width of 0.815" and length of 0.827". The tensile properties are measured using a Monsanto Tensometer from Alpha technologies. The dog bones are clamped pneumatically and pulled at a strain rate of 5"/min.

Hysteresis tests: In this test, a dog bone is stretched to 100% strain at a rate of 5"/min and then returned back to its original dimension (one stress strain cycle). The area between the curve (stretch and return cycle) is indicative of the energy dissipated and is expressed as the % of the area under the curve obtained when the sample is stretched. The point of zero stress on the return cycle is the permanent set (PS) and it is indicative of the dimensional change the part would undergo when exposed to dynamic loadings.

% Hysteresis=(AL−AU)*100/AL where AL is the area under the stress strain curve in a loading cycle and AU is the area under the curve in the unloading cycle.

Permanent set is defined as a point where the unloading curve intersects the strain axis. (Strain when stress=0). Embodiments of the polyurethane elastomers have a permanent set of less than 30%, 25%, or less than 21%.

Ageing studies: Water ageing is performed by submerging the dog bones in vials filled with water. The vial is crimped to ensure the water does not escape. The vials are then placed in a 100° C. air oven. The change in tensile properties is then tracked as a function of time.

Micro tensile dog bones are placed in a 160° C. air oven in an aluminum pan for air ageing studies. Retention in tensile properties is measured as a function of time.

Acid Resistance Test:

Acid resistant tests are done based on ASTM Method D543. For the HCl resistance test, solutions of 37% and 16% HCL were prepared. Dog-bone shaped coupons made from elastomer plaques are weighed and placed in 60 ml glass containers filed with the HCL solutions (duplicate replicas?). The plaques were held on the bottom of the jars by Teflon squares. After 7 days at room temperature, the dog-bones are rinsed with deionized H$_2$O, blotted dry and reweighed. The difference of the final mass minus the initial mass divided by the initial mass times 100 give the percent mass uptake measurement. ASTM D1708 was used for microtensile measurements before and after ageing.

Comparative Example A and Example 1

Prepolymers are prepared by reacting either TERATHANE 2000 (15.5 g, Comparative Example A) or ETERNACOLL UH-200 (15.5 g, Example 1) with ISONATE M 125 (9.5 g) for 2 hours at 80° C. The resulting prepolymer is then mixed with a curative agent (ETHACURE 300 (4.4 g) and either TERATHANE 1000 (9.8 g, Comparative Example A) or ETERNACOLL UH-100 (9.8 g, Example 1)) and poured between two TEFLON coated aluminum sheets and compressed molded at 20,000 psi for 30 minutes at 50° C. The plaques are then cured overnight in an oven at 80° C. for 16 hours. Tensile Strength, Elongation at break, and 100% modulus is given in Table 1.

TABLE 1

|  | Example 1 | Comparative Example A |
|---|---|---|
| Tensile Strength (MPa) | 48 | 24.2 |
| Elongation at Break (%) | 462 | 600 |
| 100% Modulus | 12.1 | 6.2 |

Figure 1:
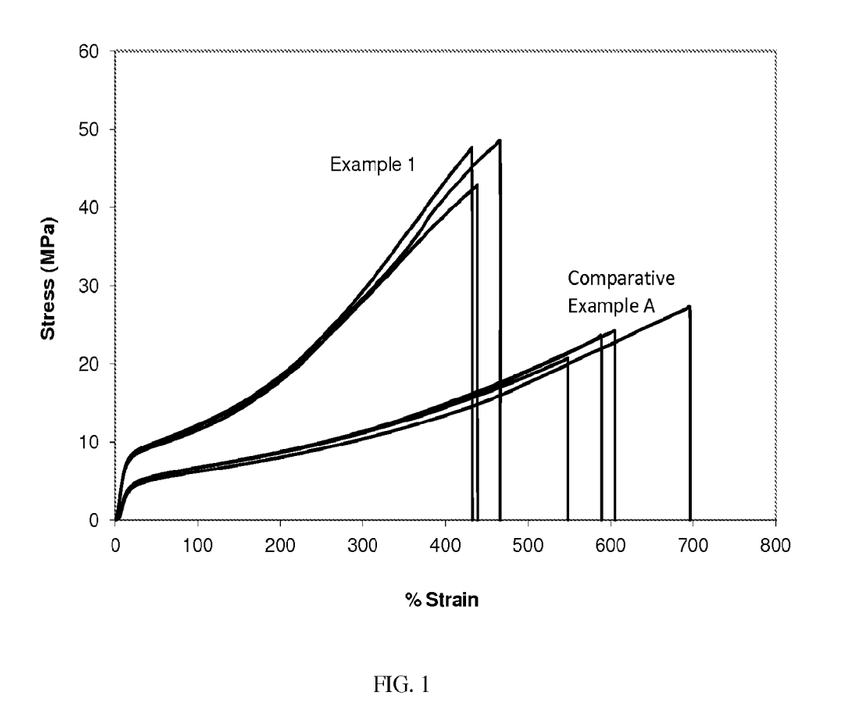
FIG. 1 is a graph showing strain vs. stress according to embodiments of the invention.

FIG. 1 depicts the stress vs. strain curve for Comparative Example A and Example 1. As can be seen in FIG. 1, the polycarbonate based elastomer, Example 1, has higher modulus but lower elongation as compared to PTMEG based materials (Comparative Example A).

Dynamic mechanical analysis of the elastomers gives an insight into the structure of the elastomers. The polycarbonate based elastomer, Example 1, has a $T_g$ of about −6° C. while PTMEG based elastomers (Comparative Example A) has a $T_g$ of about −54° C.

Figure 2:
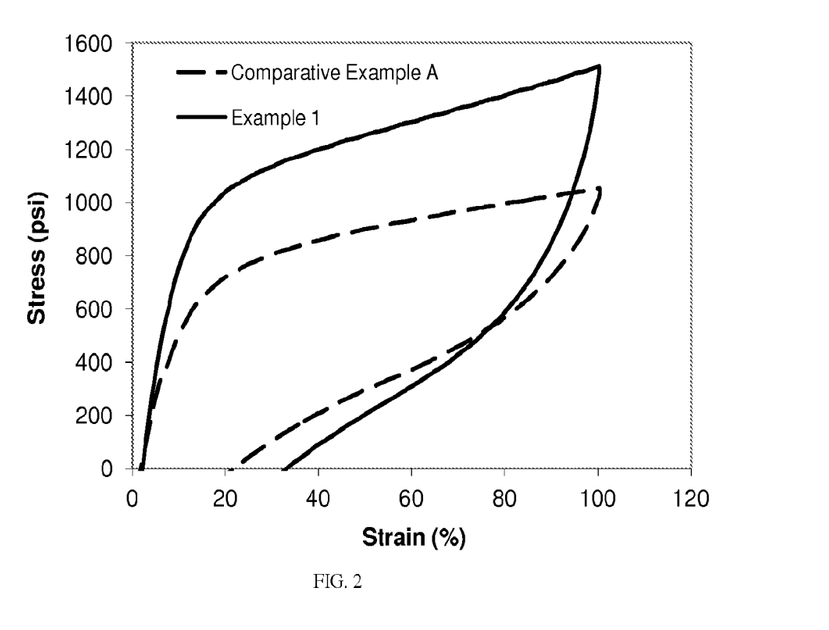
FIG. 2 is a graph showing hysteresis curves according to embodiments of the invention.

Polycarbonate polyol induces more phase mixing of the hard phase with the soft phase polyol leading to higher $T_g$ of the soft phase. Polycarbonate elastomer transition from glass phase to rubbery phase extends all the way to room temperature where all the measurements are performed. This leads to less elastic behavior and lower hysteresis performance. As seen in FIG. 2, hysteresis loss for Example 1 is about 70% while that for Comparative Example A is about 55% Similarly, permanent set for Example 1 is about 34%, while it is about 17% for Comparative Example A.

Examples 2 and 3

Prepolymers are prepared by reacting ETERNACOLL UH-200 (15.5 g for Example 2 and 18.13 g for Example 3) with ISONATE M 125 (9.5 g for Example 2) or VORANATE T-80 (6.86 g for Example 3) for 2 hours at 80° C. The resulting prepolymer is then mixed with a curative agent (ETHACURE 300 (4.0 g for Example 2 and 4.8 g for Example 3) and ETERNACOLL UH-200 (21 g for Example 2 and 14 g for Example 3)) and poured between two TEFLON coated aluminum sheets and compressed molded at 20,000 psi for 30 minutes at 50° C. The plaques are then cured overnight in an oven at 80° C. for 16 hours. Tensile Strength, Elongation at break, and 100% modulus is given in Table 2.

TABLE 2

|  | Example 2 | Example 3 |
|---|---|---|
| Tensile Strength (MPa) | 47.4 | 44.5 |
| Elongation at Break (%) | 458 | 551 |
| Modulus 100% (MPa) | 7.5 | 8.9 |

Figure 3:
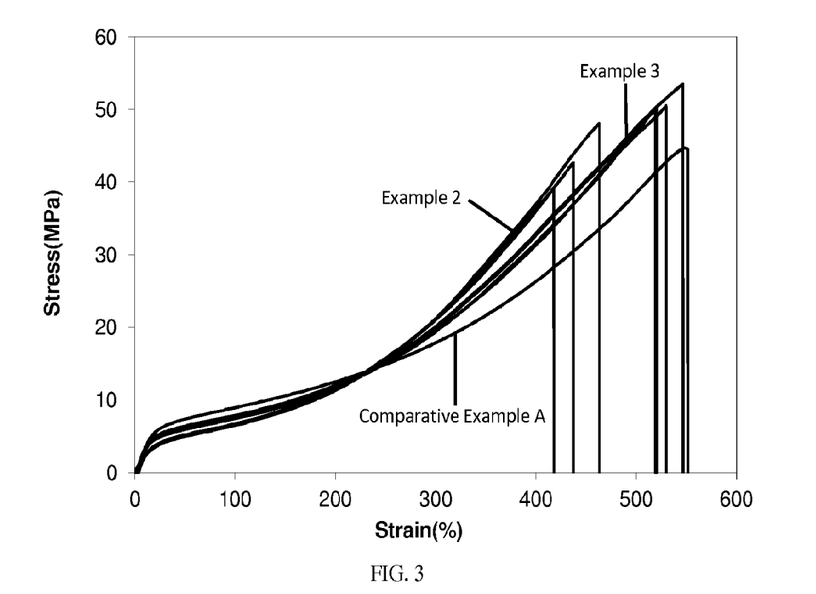
FIG. 3 is a graph showing strain vs. stress according to embodiments of the invention.
Figure 4:
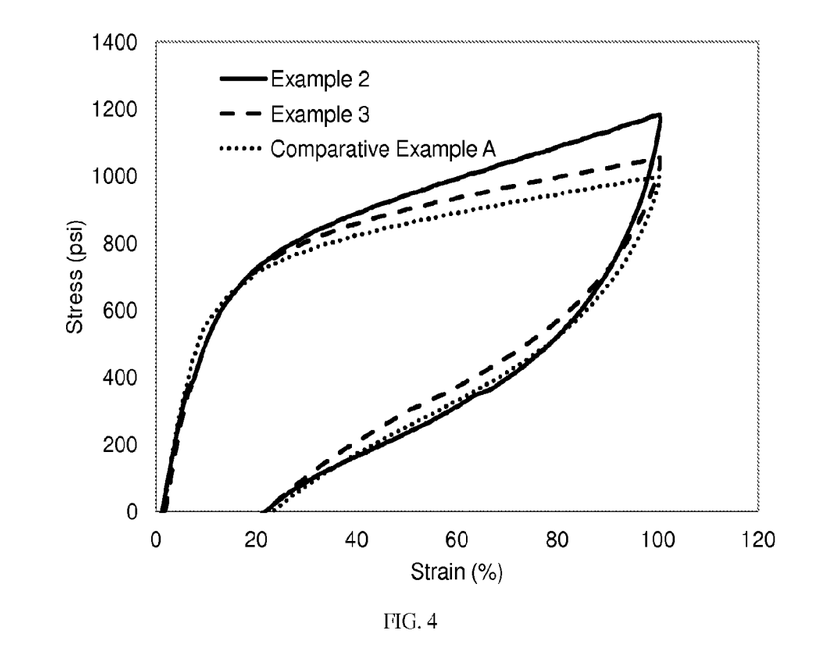
FIG. 4 is a graph showing hysteresis curves according to embodiments of the invention.

By lowering the diamine content (Ethacure 300) and changing the molecular weight of the curative polyol to about 2000 hysteresis losses and permanent set can be lowered significantly. This change also makes the elastomer mechanical properties similar to PTMEG (see FIG. 3). The stiffness of polycarbonate polyol helps to compensate for lowering hard segment content. The effect of changing the isocyanate is also evaluated. TDI based material (Example 3) give higher flexibility and make the elastomer equivalent to PTMEG (Comparative Example A). Hysteresis loss of polycarbonate polyol based formulations (Examples 2 and 3) is about 63% and a PS of 21% (See FIG. 4). $T_g$ of Example 2 is −21° C., lower than for Example 1 (−6° C.), which is in line with the theory that higher molecular weight of the polyol leads to better phase separation. Example 3 shows a sharper peak indicating more phase segregation as compared to Example 2. The value of $T_g$ for Example 3 is about −23° C.

Figure 5:
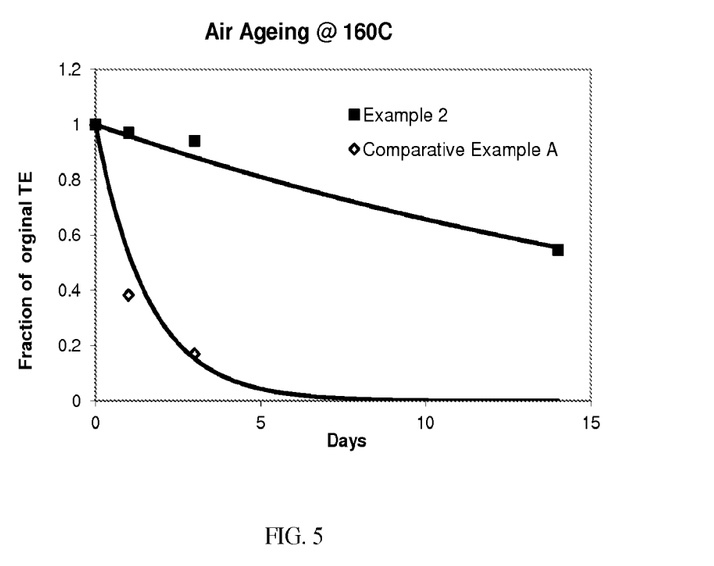
FIG. 5 is a graph showing sample aging in air according to embodiments of the invention.
Figure 6:
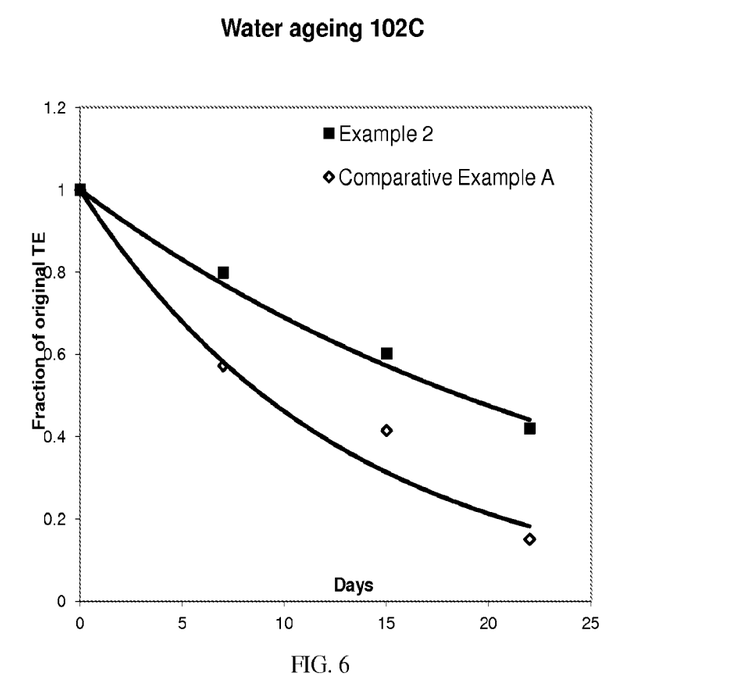
FIG. 6 is a graph showing sample aging in water according to embodiments of the invention.

The oxidative, hydrolytic and chemical resistance of the elastomers made using MDI based isocyanate (Comparative Example A and Example 2) are also studied. The elastomer dog bones are aged in air at 160° C. and the loss in tensile strength is followed as a function of time. PTMEG elastomers (Comparative Example A) are completely degraded after 2 weeks while polycarbonate elastomers (Example 2) only lose 40% of the original Tensile strength (FIG. 5). Similarly the elastomer dog bones are aged in water at 102° C. and change in TS as function of time is tracked (FIG. 6). Degradation of Comparative Example A is twice as fast as Example 2 in water.

The dog bones are soaked in various solvents (methyl ethyl ketone, toluene, ethyl acetate, cyclohexanone, t-butyl phosphate and isopropanol) for 72 hrs and change in weight is measured (Table 1). Comparative Example A and Example 2 show similar increase in weight when soaked in methyl ethyl ketone, tolune, ethyl acetate and cyclohexanone. The resistance to t-butyl phosphate (300% vs. 489%) and IPA (2% vs. 20%) for Example 2 elastomer is much better than Comparative Example A.

TABLE 3

| | Example 2 | Comparative Example A |
|---|---|---|
| Methyl ethyl ketone | 107 | 84 |
| Toluene | 71 | 83 |
| Ethyl acetate | 74 | 63 |
| Cyclohexane | 3425 | 301 |
| Isopropanol | 2 | 20 |
| T-butyl phosphate | 300 | 489 |

Comparative Example B and Example 4

Prepolymers are prepared by reacting ETERNACOLL UH-200 (Example 4 100 parts) or TERATHANE 2000 (Comparative Example B, 100 parts) with ISONATE M 125 (38.5 parts) or for 2 hours at 80° C. The prepolymer of Example 4 has a NCO content of 10.2% [[ASTM D5155]] and a viscosity at 75° C. of 3720 mPa·s using ICI Cone & Plate Viscometer. After about 5.5 months of storage at room temperature Example 4 prepolymer has a NCO content of 10.5% and a viscosity at 75° C. of 3600 mPa·s as measured using a parallel plate rheometer.

The prepolymers (100 parts, heated to 85° C.) are then mixed with ETHACURE 300 (25 parts) using a Polytec EMC Type DG 103 metering unit and a 2 PEG mixing chamber with a 4 mm round nozzle and a free mixing speed of 1800 rpm. The mixture is applied to a 160 mm diameter shaft having a rotation speed of 38 rpm. A 25 mm thick coating is formed around the shaft. Hardness is measured after 20 hours of conditioning at 20-23° C. The Shore D hardness is about 65-70. Sheets are machined from the roller coating for tensile properties measurements (Table 4). For Example 4, two specimens obtained from the coating are measured.

TABLE 4

| | Comparative Example B | Example 4 Specimen 1 | Example 4 Specimen 2 |
|---|---|---|---|
| Hardness [ShD] | 70 | 71 | 71 |
| Tensile Str. At Break [MPa] | 36 | 43.2 | 45.6 |
| 100% Modulus [MPa] | 30.8 | 33.7 | 34 |

TABLE 4-continued

| | Comparative Example B | Example 4 Specimen 1 | Example 4 Specimen 2 |
|---|---|---|---|
| Elongation At Break [%] | 250 | 181.2 | 204 |
| Angle Tear Str. [N/mm] | 165 | 267 | 301 |
| DIN Abrasion Resistance [mm³] | 100 | 68 | 72 |

Example 5

Prepolymers are prepared by reacting TERATHANE 2000 (7.75 g) and ETERNACOLL UH-200 (7.75 g) with ISONATE M 125 (9.5 g) for 2 hours at 80° C. The resulting prepolymer is then mixed with a curative agent (ETHACURE 300 (4 g) and ETERNACOLL UH-200 (21 g) and poured between two TEFLON coated aluminum sheets and compressed molded at 20,000 psi for 30 minutes at 50° C. The plaques are then cured overnight in an oven at 80° C. for 16 hours. The Hysteresis is measured to be 63% with a permanent set of about 25%. There are 2 tan delta peaks observed, one at −69° C. and other at −24.6° C. The value of tan delta is 0.09 at 25° C. The tensile properties, Tensile Strength: 39 MPa, Elongation at Break: about 340%, Modulus at 100%: 12.4 MPa.

Comparative Example C and Examples 6-9

Prepolymer:

Eternacoll PH-200 (3.1 kg, 56.6 OHV) is melted overnight at 75° C. and charged into a warm, stirring reaction vessel. The temperature is raised to 100° C. and Eternacoll PH-200 is dehydrated under vacuum until a water content less than 0.04% is achieved. The temperature is lowered until Eternacoll UH-200 reaches 60° C., after which a pre-melted, fresh Isonate M125 (1.937 kg, 33.3% NCO) is rapidly added and allowed to stir under vacuum. The exotherm profile is recorded to peak at 95° C., which subsides after 15 minutes. Once the temperature cools to 70° C., the contents are held steady at 75° C. for two hours under constant stir and vacuum. A sample is extracted and NCO content is determined (10.20%, target is 10.20%). The resulting prepolymer is drained into a clean, dry, warm metal container which was then sealed and stored at room temperature until use.

Curative:

Eternacoll PH-200 (4 kg, 56.6 OHV) is melted overnight at 75° C. and charged into a warm container. Ethacure 300 (1 kg, 531 OHV) is added to give a 2:8 Ethacure 300:Eternacoll PH-200 w/w ratio composition (Example 8). The contents of the container is then sealed and stored at room. Similarly, three other weight ratio curatives are made (Examples 6, 7, and 9, ratios are given in Table 5).

The curatives are reacted and cast onto a mould individually with the prepolymer at 75° C. at an index of 1.056 (Example 6-9). For Comparative Example C, the prepolymer is the prepolymer of Comparative Example B.

TABLE 5

| | Curative | | | | | | Elongation | | |
|---|---|---|---|---|---|---|---|---|---|
| | Weight fraction E300 | Weight fraction PH200 | Hardness | Angle tear (N mm$^{-1}$) | Young's modulus (MPa) | Tensile strength (MPa) | at break (%) | 100% modulus (MPa) | 200% modulus (MPa) |
| Example 6 | 1 | 0 | 74 ShD | 174 | 685.35 | 44.4 | 201.1 | 35.3 | 44.0 |
| Example 7 | 0.3 | 0.7 | 96 ShA | | 137.00 | 45.2 | 275.7 | 13.4 | 26.2 |
| Example 8 | 0.2 | 0.8 | 92 ShA | | 74.70 | 41.3 | 263.1 | 10.0 | 20.5 |
| Example 9 | 0.1 | 0.9 | 81 ShA | | 14.05 | 40.3 | 346.5 | 4.8 | 7.6 |
| Comparative Example 1 | 1 | 0 | 63 ShD | 146 | 408.77 | 37.6 | 306.1 | 21.3 | 27.6 |

Example 10 and Comparative Example D

Prepolymer for Example 10 is prepared by reacting ETERNACOLL UH-200 (74.76 g) with ISONATE M 125 (74.76 g) for approximately 4 hours at 80° C. The prepolymer has a NCO content of approximately 10 percent by weight. The resulting prepolymer (32 g) is then mixed with a curative agent (ETHACURE 300 (8 g) and poured onto steel plate with spacer (coated with a demold spray), covered with a metal plate; pressured to 10000 psi for 5 minutes. The plaques are then cured for 25 h in an oven at 80° C.

The mass uptake behavior of the samples is given in Table 6. The difference of the final mass minus the initial mass divided by the initial mass times 100 give the percent mass uptake measurement.

TABLE 6

Summary of the mass swelling data.

| | Conditions | |
|---|---|---|
| | ~16% HCl/RT | ~37% HCl/RT |
| Comparative D (CSPE)* | 1% | 7% |
| Example 10 | 0% | 8% |

*CSPE is chlorosulfonated polyethylene purchased from MCMaster-Carr and is a material commonly used for coating acid pickling rollers.

The results indicate the mass uptake is very low for both samples.

The mechanical properties of the elastomers after acid aging are presented in Table 7. The mechanical properties between the CSPE and the elastomer of the present invention are comparable at 16% HCl, and at 37% HCl. There was a statistically meaningful drop in modulus for Example 10, at 37% HCl aging, however; it is believed the modulus is still acceptable for coating rollers used in acid picking applications.

TABLE 7

| | As is | | | 16% HCl/RT | | | 37% HCl/RT | | |
|---|---|---|---|---|---|---|---|---|---|
| | Tensile strength (psi) | Modulus (psi) | Elongation (%) | Tensile strength (psi) | Modulus (psi) | Elongation (%) | Tensile strength (psi) | Modulus (psi) | Elongation (%) |
| Comparative Example D | 2205 | 759 | 440 | 2170 | 731 | 454 | 1871 | 588 | 383 |
| Example 10 | 6509 | 7662 | 491 | 6516 | 7757 | 497 | 2948 | 5603 | 567 |

The invention claimed is:

1. An elastomeric cover for papermaking rollers or acid pickling rollers, the elastomeric cover being coated on a papermaking roller or an acid pickling roller and comprising a polyurethane layer having a hysteresis value of less than 70% and a permanent set of less than 30%;
   wherein the polyurethane layer comprises a polyurethane produced by curing a mixed composition comprised of at least a urethane prepolymer (A) and at least a curing agent (B) having an active hydrogen group (H), the at least a urethane prepolymer (A) and the at least a curing agent (B) being reacted at a first isocyanate index from 85 to 120,
   the urethane prepolymer (A) having at least one terminal isocyanate group and is obtained by reacting at least a polyisocyanate compound (a) with polyol components that includes at least a polycarbonate diol compound (b), having a number average molecular weight of at least 1500 g/mol, the polyisocyanates compound (a) and the polyol components being reacted at a second isocyanate index between 120 and 2000, and
   the curing agent (B) comprising at least an amine compound.

2. The elastomeric cover of claim 1, wherein the curing agent (B) further comprises the least the polycarbonate diol compound (b) having a number average molecular weight of at least 1500 g/mol.

3. The elastomeric cover of claim 1, wherein the curing agent (B) further comprises at least a polytetramethylene ether glycol (PTMEG) (c), having a number average molecular weight of between 500 and 3000 g/mol.

4. The elastomeric cover of claim 1, wherein the urethane prepolymer (A) is obtained by reacting the at least a polyisocyanate compound (a) with the at least a polycarbonate diol compound (b) and at least a polytetramethylene ether glycol (PTMEG) (c), having a number average molecular weight of between 500 and 3000 g/mol.

5. The elastomeric cover of claim 1, wherein the least a polycarbonate diol compound (b) has a number average molecular weight of between 1500-3000 g/mol.

6. The elastomeric cover of claim 1, wherein the least a polycarbonate diol compound (b) has a number average molecular weight of between 1900 and 2100 g/mol.

7. The elastomeric cover of claim 1, wherein the at least a polycarbonate diol compound (b) is a 1,6-hexanediol based polycarbonate diol.

8. The elastomeric cover of claim 1, wherein the at least a polycarbonate diol compound (b) is a 1,5-pentanediol based polycarbonate diol.

9. The elastomeric cover of claim 1, wherein the at least a polycarbonate diol compound (b) is a 1,6-hexanediol and 1,5-pentanediol based polycarbonate diol.

10. The elastomeric cover of claim 1, wherein the at least an amine compound is at least one of 3,5-diethyltoluene-2,4-diamine, 3,5-diethyltoluene-2,6-diamine, 3,5-dimethylthiotoluene-2,4-diamine, 3,5-dimethylthiotoluene-2,6-diamine, 4,4'-bis(2-chloroaniline), 4,4'-bis(sec-butylamino)-diphenylmethane, N,N'-dialkyldiaminodiphenylmethane, 4,4'-methylenedianiline, 4,4'-methylene-bis(2,3-dichloroaniline), 4,4'-methylene-bis(2-chloroaniline), 4,4'-methylene-bis(2-ethyl-6-methylaniline), trimethylene-bis(4-aminobenzoate), poly(tetramethylene oxide)-di-p-aminobenzoate, phenylenediamine, polyetherdiamine, isophorone diamine, 4,4'-methylene-bis-(2-methylcyclohexane-1-amine), 4,4'-methylene-bis(cyclohexaneamine), bis(aminomethyl)cyclohexane, or xylenediamine.

11. The elastomeric cover of claim 1, wherein the at least an amine compound is at least one of iminobispropylamine, bis(hexamethylene)triamine, triethylenetetramine, tetraethylenepentamine, pentaethylenehexamine, dipropylenetriamine, aminoethylethanolamine, tri(methylamino)hexane, and melamine.

12. The elastomeric cover of claim 1, wherein the at least an amine compound comprises at least 3,5-dimethylthio-2,6-toluenediamine and 3,5-dimethylthio-2,4-toluenediamine.

13. The elastomeric cover of claim 1, wherein the hysteresis value is less than 60.

14. The elastomeric cover of claim 1, wherein the hysteresis value is less than 55.

15. The elastomeric cover of claim 1, wherein the permanent set is less than 25%.

16. The elastomeric cover of claim 1, wherein the permanent set is less than 21%.

17. A shoe press belt for papermaking comprising a fabric base and a polyurethane layer which are integral with each other, the polyurethane layer having a hysteresis value of less than 70% and a permanent set of less than 30%;
   wherein the polyurethane layer comprises a polyurethane produced by curing a mixed composition of a urethane prepolymer (A) and a curing agent (B) having an active hydrogen group, the urethane prepolymer (A) and the curing agent (B) being reacted at a first isocyanate index from 85 to 120,
   the urethane prepolymer (A) having at least one terminal isocyanate group is obtained by reacting at least a polyisocyanate compound (a) with polyol components that includes at least polycarbonate diol compound (b) having a number average molecular weight of at least 1500 g/mol, the polyisocyanates compound (a) and the polyol components being reacted at a second isocyanate index between 120 and 2000; and
   the curing agent (B) comprising at least an amine compound.

18. The shoe press belt of claim 2, wherein the curing agent (B) further comprises the least the polycarbonate diol compound (b) having a number average molecular weight of at least 1500 g/mol.

* * * * *